United States Patent
Ballu (12)

(10) Patent No.: US 10,264,779 B2
(45) Date of Patent: Apr. 23, 2019

(54) SPRAY BAR SUSPENSION DEVICE FOR AN AGRICULTURAL VEHICLE

(71) Applicant: EXEL INDUSTRIES, Epernay (FR)

(72) Inventor: Patrick Jean Marie Ballu, Reims (FR)

(73) Assignee: EXEL INDUSTRIES, Epernay (FR)

( * ) Notice: Subject to any disclaimer, the term of this patent is extended or adjusted under 35 U.S.C. 154(b) by 509 days.

(21) Appl. No.: 13/933,334

(22) Filed: Jul. 2, 2013

(65) Prior Publication Data

US 2014/0014737 A1    Jan. 16, 2014

(30) Foreign Application Priority Data

Jul. 10, 2012  (FR) ...................................... 12 56619

(51) Int. Cl.
*A01M 7/00* (2006.01)

(52) U.S. Cl.
CPC ........ *A01M 7/0071* (2013.01); *A01M 7/0053* (2013.01)

(58) Field of Classification Search
CPC .......................... A01M 7/0071; A01M 7/0053
USPC ........................................ 239/159, 166, 167
See application file for complete search history.

(56) References Cited

U.S. PATENT DOCUMENTS

| | | | | |
|---|---|---|---|---|
| 4,394,968 A | * | 7/1983 | Tyler ................... | A01M 7/0075 239/167 |
| 5,794,852 A | * | 8/1998 | Wald ................... | A01M 7/0057 239/167 |
| 2004/0231308 A1 | * | 11/2004 | Murphy ................. | A01D 47/00 56/14.9 |
| 2009/0173802 A1 | * | 7/2009 | Theeuwen ........... | A01C 23/008 239/164 |

\* cited by examiner

*Primary Examiner* — Darren W Gorman
*Assistant Examiner* — Qingzhang Zhou
(74) *Attorney, Agent, or Firm* — Cantor Colburn LLP

(57) ABSTRACT

A spray bar suspension device for an agricultural vehicle, including a stationary frame, a right bar holder and a left bar holder that are pivotably mounted on said stationary frame, and damping elements inserted between each of said holders and the stationary frame, where the damping elements include:

two rotational supports secured to said stationary frame,
right and left structures respectively articulated to said right and left holders, and each pivotably mounted alternating on said rotational supports, and
so-called primary elastic elements respectively inserted between each of said right and left structures and said stationary frame,
such that an oscillation of each holder around its normal operating position results in tilting the structure associated with that holder from one to the other of said rotational supports, then pivoting said structure around said support, against the elastic elements.

9 Claims, 3 Drawing Sheets

SPRAY BAR SUSPENSION DEVICE FOR AN AGRICULTURAL VEHICLE

TECHNICAL FIELD

The present invention relates to a spray bar suspension device for an agricultural vehicle, and an agricultural vehicle equipped with such a device.

BACKGROUND

Reference will be made to the appended FIG. 1, which diagrammatically shows a top view of a spray bar suspension device of the state of the art.

In that figure, arrow A indicates the direction of travel of the agricultural vehicle E equipped with the device.

The suspension device comprises a stationary frame 1 secured on the vehicle E, a right bar holder 3 and a left bar holder 5 both pivotably mounted on the stationary frame 1, and right 7 and left 9 spray bars mounted stationary on said respective holders.

Right 11 and left 13 actuating cylinders, inserted between the stationary frame 1 and the respective holders 3, 5, make it possible to pivot said holders from a deployed position shown in FIG. 1, in which the two spray bars extend transversely to the direction of travel A and are thus ready for spraying, to a folded position, in which the two holders 3, 5 have pivoted toward the front of the vehicle, thereby placing the spray bars 7 and 9 in a direction substantially parallel to the direction of travel A.

This folded position in particular allows the agricultural vehicle to travel on the road.

A constant problem observed of the state of the art is the oscillating movement of the spray bars 7, 9, in particular in certain situations such as turns, braking and acceleration of the vehicle E: this is traditionally referred to as a "whiplash effect."

These oscillations, which are particularly significant at the end of the bar given the considerable length of said bars, create very significant forces in the suspension device, which may break or deform the latter.

For that reason, different systems for damping these oscillations have been considered in the prior art.

Thus, in the device of FIG. 2, a slide 15 is inserted between the two cylinders 11 and 13, which can slide on the stationary frame while being returned to a central equilibrium position by elastic elements such as a spring 17. This device of the prior art allows pivoting with elastic return of the holders 3, 5 and therefore the associated bars 7, 9 both toward the front and the rear of the vehicle E, without phase lag.

In the device of the prior art shown in FIG. 3, compression springs 19, 21 are respectively inserted between the cylinders 11, 13 and the stationary frame 1.

These springs allow a rotation with elastic return of the bars 7, 9 only toward the rear of the vehicle E, with no phase lag.

The device of the prior art shown in FIG. 4 results from a combination of the two previous devices, and thus comprises not only a slide 15 elastically returned to its equilibrium position by the spring 17, but also compression springs 19 and 21 inserted between said slide 15 and the respective cylinders 11, 13.

This device of the prior art allows rotations of the bars 7, 9 both toward the front and the rear of the vehicle E, and a phase lag in the time of the oscillations of those two bars, in particular during turns, braking, acceleration of the vehicle E.

BRIEF SUMMARY

The present invention aims to provide a spray bar suspension device for an agricultural vehicle making it possible to improve the damping of the oscillations of the two spray bars, with respect to the devices of the prior art described above.

This aim of the invention is achieved with a spray bar suspension device for an agricultural vehicle, comprising a stationary frame, a right bar holder and a left bar holder that are pivotably mounted on said stationary frame, and damping elements inserted between each of said holders and the stationary frame, remarkable in that said damping elements comprise:
  two rotational supports secured to said stationary frame,
  right and left structures respectively articulated to said right and left holders, and each pivotably mounted alternating on said rotational supports, and
  so-called primary elastic elements respectively inserted between each of said right and left structures and said stationary frame,
such that an oscillation of each holder around its normal operating position results in tilting the structure associated with that holder from one to the other of said rotational supports, then pivoting said structure around said support, against the elastic elements.

These damped tilting movements of each structure on the rotational supports allow very effective damping, i.e., by absorbing the maximum amount of energy, of the whiplash movements of the spray bars, both toward the front and the back, during turns, acceleration, and deceleration.

According to other optional features of the suspension device according to the invention:
  so-called secondary elastic elements are inserted between said right and left structures;
  said secondary elastic elements are dimensioned such that oscillations with a relatively small amplitude of one of said holders have no effect on the other holder, and oscillations with a relatively significant amplitude of one of said holders cause oscillations of the other holder;
  said primary elastic elements comprise, for each structure, a plurality of springs working in compression, positioned so as to create different lever arms on the concerned structure;
  cylinders for folding/unfolding the spray bars are inserted between each holder and its associated structure.

The present invention also relates to an agricultural spray vehicle, remarkable in that it is equipped with the device according to the preceding, supporting spray bars mounted on said holders.

BRIEF DESCRIPTION OF THE DRAWINGS

Other features and advantages of the present invention will appear in light of the following description, and upon examining the appended figures, in which.

In all of these figures, identical or similar references designate identical or similar members or sets of members.

Hereafter, the adjectives "right" and "left" will be used: these terms must be understood as "on the right" and "on the left" with respect to the direction of travel of the vehicle E, indicated by arrow A in the different figures.

DETAILED DESCRIPTION

Figure 1:
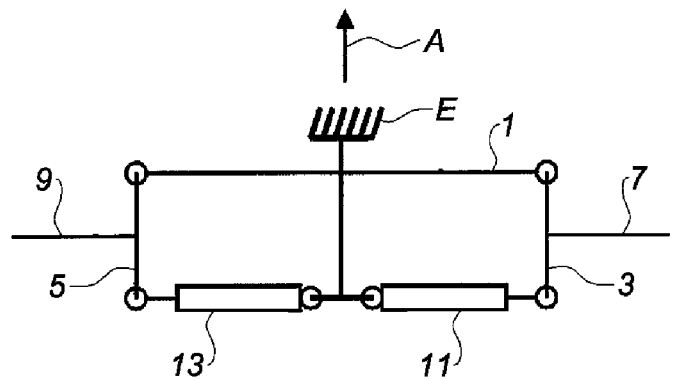
FIGS. 1 to 4 diagrammatically describe different spray bar suspension devices for an agricultural vehicle of the prior art, described in the preamble of the present description, FIG. 5 diagrammatically shows a spray bar suspension device for an agricultural vehicle according to the present invention, in the idle position.
Figure 2:
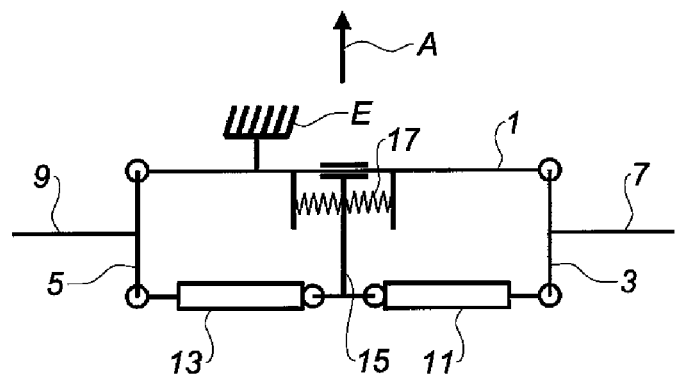
Figure 3:
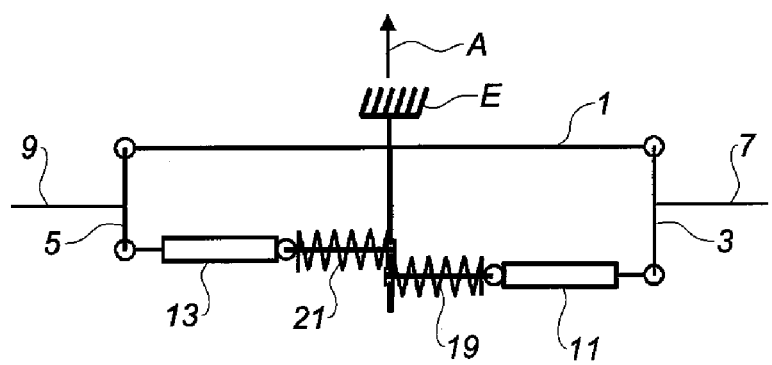
Figure 4:
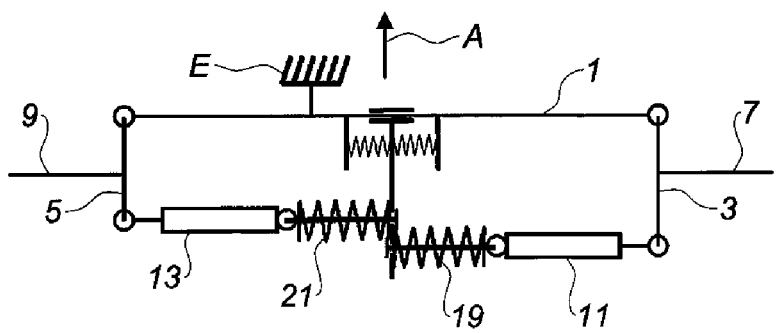
Figure 5:
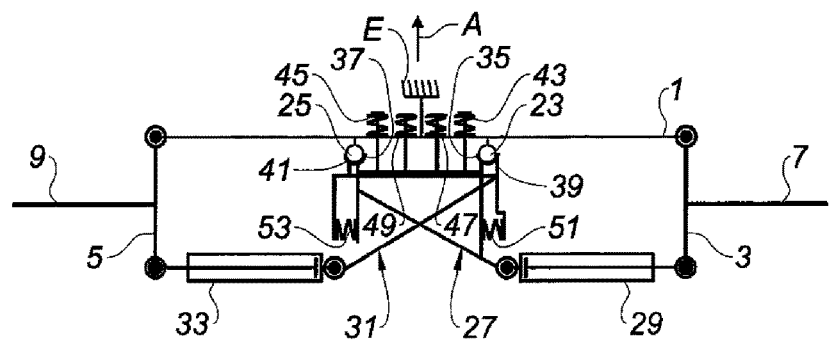

FIG. 5 shows that the suspension device according to the invention comprises a stationary frame 1, on which a right holder 3 and a left holder 5 are pivotably mounted, right 7 and left 9 spray bars respectively being mounted in a stationary manner on those two holders.

Damping elements are provided between said two holders and the stationary frame 1, as will be described below.

These damping elements comprise right 23 and left 25 rotational supporting elements mounted secured on the stationary frame 1, said supporting elements being able to assume the form of balls or cylinders.

A right structure 27 is articulated on a right actuating cylinder 29, which in turn is articulated on the right holder 3.

Likewise, a left structure 31 is articulated on a left actuating cylinder 33, which in turn is articulated on the left holder 5.

The right structure 27 includes two right 35 and left 37 clevis mountings fitting the shape of the respective supports 23 and 25, and extending over substantially one quarter of the circumference of those supports.

Likewise, the left structure 31 includes right 39 and left 41 clevis mountings, fitting the shapes of the respective supports 23 and 25, and extending over circumference quarters of said supports, in a manner complementary to the clevis mountings 35 and 37 of the right structure 27.

Two primary compression springs 43 and 45 are inserted between the right structure 27 and the stationary frame 1.

Likewise, two other primary compression springs 47 and 49 are inserted between the left structure 31 and the stationary frame 1.

Optionally, secondary compression springs 51 and 53 are inserted, on the right and on the left, respectively, between the right structure 27 and left structure 31.

The operating mode and the advantages of the device described above are as follows.

Figure 6:
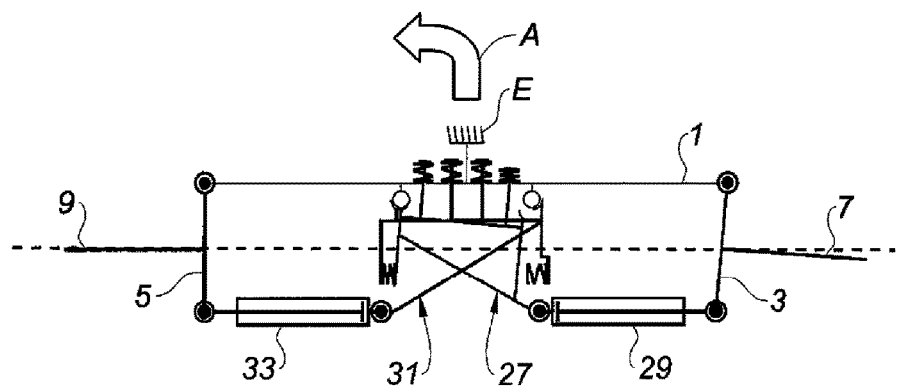
FIG. 6 shows this device during a left turn with a relatively low acceleration.

Reference will be made to FIG. 6, in which arrow A indicates that the agricultural vehicle E equipped with the device according to the invention is turning to the left, with a low acceleration.

In this scenario, the right bar 7, located outside the turn, tends to remain at the rear of the vehicle, and therefore to pivot in the clockwise direction, as shown in FIG. 6.

Under the effect of this rotation of the bar 7 and its associated right holder 3, the primary springs 43 and 45 are compressed, and a rotation of the right structure 27 occurs around the left support 25, owing to the left clevis mount 37 of the right structure 27.

In so doing, the left secondary spring 53 is compressed, but not enough to cause movement of the left structure 31, in light of the relatively low acceleration involved.

After this backward movement, the right bar 7 is returned toward the front of the vehicle E, under the effect of the primary springs 43, 45 and the secondary spring 53.

The right clevis mount 35 of the right structure 27 then bears on the right support 23, thereby allowing a rotation of the right structure 27 around said right support 23.

The primary springs 43, 45 as well as the secondary spring 51 are then compressed, and it will therefore be understood that a movement with rapidly damped oscillations of the right bar 7 around its equilibrium position is established.

The speed of the damping is procured by the combined effect of the primary springs 43, 45, the secondary springs 51, 53, and the tilting of the holder 27 from one to the other of the rotational supports 23 and 25.

Figure 7:
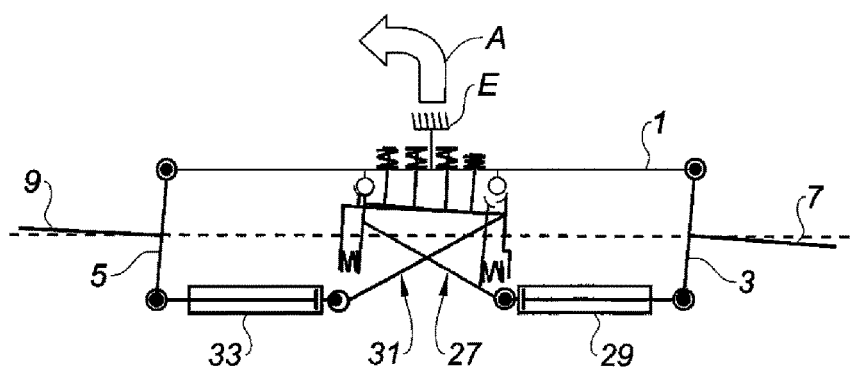
FIG. 7 shows this device in a left turn situation with a relatively significant acceleration.

In the event of a more significant bias, for example coming from a left turn A with a greater acceleration, the rotation of the right structure 27 around the left support 25 has a sufficiently significant travel in order to in turn cause the clockwise rotation of the left structure 31 around the left support 25, by means of the left secondary spring 53, as shown in FIG. 7.

Thus, through the combined play of these holder structures 27 and 31, the rotation of the right bar 7 in the clockwise direction also causes the left bar 9 to rotate in the same direction.

Under the action of the springs 43, 45, 47, 49, 53, the right 7 and left 9 bars are next returned to a position opposite that shown in FIG. 7, in which they have therefore pivoted counterclockwise with respect to their equilibrium position.

It will therefore be understood that the springs 43, 45, 47, 49, 51, 53, as well as the tilting of structures 27, 31 on the supports 23, 25, make it possible to absorb the energy transmitted by the bars 7 and 9 due to the accelerations of the agricultural vehicle E.

More particularly, the phase lag of the right 7 and left 9 bars that can be seen in FIG. 7, through which the left bar 9 returns toward the rear of the vehicle E while the right bar 7 returns toward the front of said vehicle E, and vice versa, makes it possible to cancel out the energies transmitted to those two bars.

Figure 8:
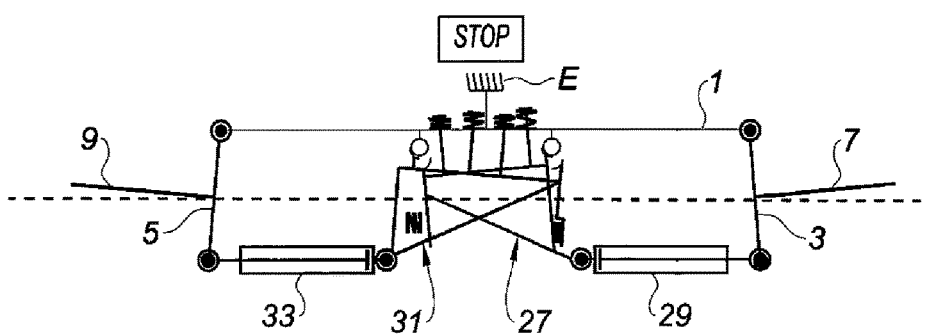
FIG. 8 shows this device in a braking situation of the agricultural vehicle.

In a braking situation, shown in FIG. 8, the two bars 7, 9 tend to move toward the front of the vehicle E, thus causing pivoting of the right 3 and left 5 holders, and thereby of the right 27 and left 31 structures, in the counterclockwise direction and the clockwise direction, respectively.

In so doing, the springs 43, 45, 47, 59, 51 are compressed by different degrees, the spring 53 being relaxed.

The left clevis mount 37 of the right holder 27 moves away from the left support 25, such that the right holder 27 pivots around the right support 23.

Conversely, the right clevis mount 39 of the left holder 31 moves away from the right support 23, such that the left holder 31 pivots around the left support 25.

Figure 9:
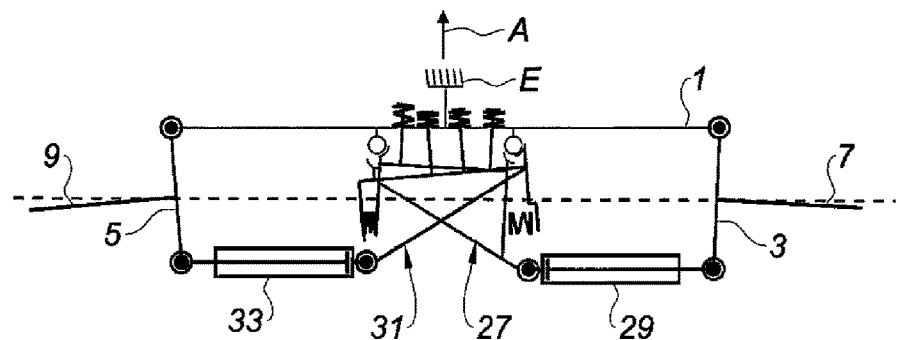
FIG. 9 shows this device just after braking.

Due to the return of the various aforementioned elastic elements, the right and left bars 7 and 9 are then returned toward the rear of the apparatus, as shown in FIG. 9, thus causing the compression of the left secondary spring 53 and the extension of the secondary spring 51.

A state of very quickly damped oscillation, making it possible to effectively dissipate the energy transmitted by the bars, is thus established.

Figure 10:
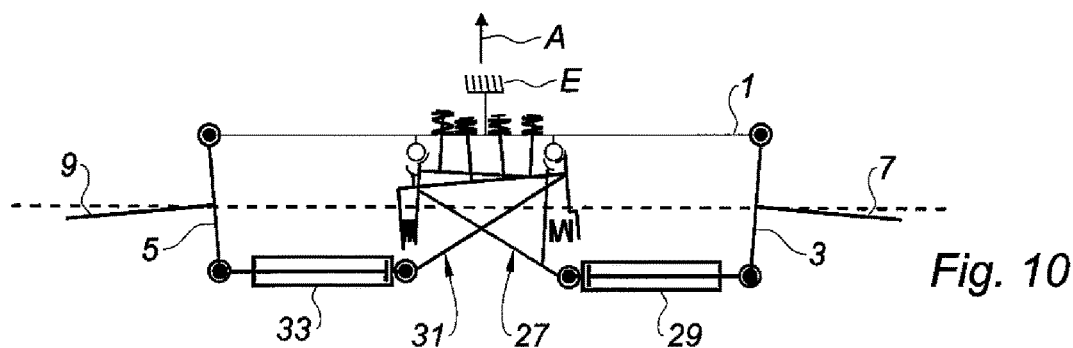
FIGS. 10 and 11 are respectively similar to FIGS. 8 and 9, for an acceleration situation of the agricultural vehicle.

Likewise, in the acceleration situation shown in FIG. 10, the two bars 7 and 9 are driven toward the rear of the vehicle E, causing the compression of the various primary springs 43, 45, 47, 49, the compression of the left secondary spring 53 and the extension of the right secondary spring 51.

Figure 11:
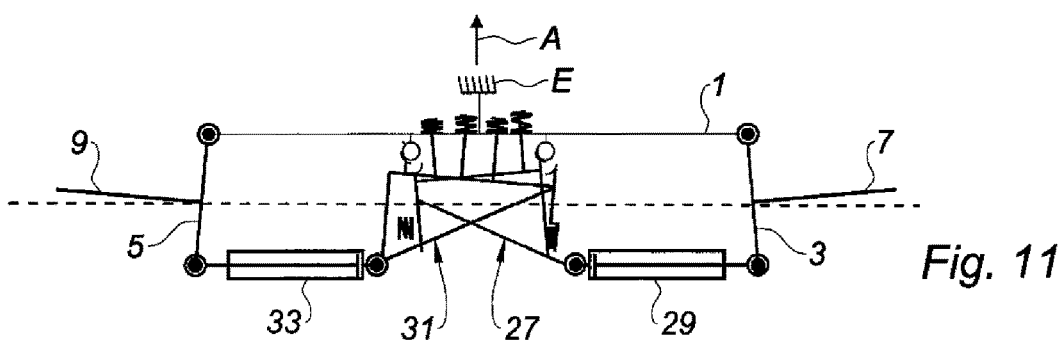

Once the acceleration is complete, the two bars 7 and 9 tend to move toward the front of the agricultural vehicle E, as shown in FIG. 11, thereby compressing the right secondary spring 51 and relaxing the left secondary spring 53.

Here again, a state of very quickly damped oscillations is established, allowing very effective dissipation of the energy transmitted by the bars 7 and 9.

As will have been understood in light of the preceding description, the suspension device according to the invention allows very effective dissipation of the energy transmitted to the spray bars by the various accelerations of the agricultural vehicle bearing them.

Of course, the present invention is in no way limited to the embodiment described and illustrated, which has been provided as a simple example.

The invention claimed is:

1. A spray bar suspension device for an agricultural vehicle, comprising a stationary frame, a right bar holder and a left bar holder that are pivotably mounted on said stationary frame between a deployed position wherein a right spray bar and a left spray bar extend transversely to the direction of travel and are configured for spraying, and a folded position wherein the right and left bar holders have pivoted towards the front of the vehicle, such that the right and left spray bars are disposed in a direction substantially parallel to the direction of travel, the right spray bar being mounted stationary on the right bar holder and the left spray bar being mounted stationary on the left bar holder, and damping elements inserted between each of said holders and the stationary frame, wherein said damping elements comprise:

two rotational supports secured to said stationary frame,
   right and left structures respectively articulated to said right and left holders, and each pivotably mounted alternating on said two rotational supports, the right structure including first and second clevis mountings configured to fit said two rotational supports and disposed adjacent said two rotational supports, and the left structure including third and fourth clevis mountings configured to fit said two rotational supports and disposed adjacent said two rotational supports, and
   primary elastic elements respectively inserted between each of said right and left structures and said stationary frame,
   such that an oscillation of each holder around its normal operating position results in tilting the structure associated with that holder from one to the other of said rotational supports, then pivoting said structure around said support, against the elastic elements,
   wherein secondary elastic elements are inserted between said right and left structures, and a rotation of one of the right and left structures around one of said two rotational supports causes rotation of the other of the right and left structures around the other of said two rotational supports by means of one of the secondary elastic elements,
   wherein the primary and secondary elastic elements and the right and left structures are configured to absorb energy transmitted by the right and left spray bars such that one of the right and left spray bars returns towards the rear of the vehicle while the other of the right and left right spray bars returns toward the front of the vehicle in order to cancel energy transmitted to the right and left spray bars.

2. The device according to claim 1, wherein said primary elastic elements comprise, for each structure, a plurality of springs working in compression, positioned so as to create different lever arms on the concerned structure.

3. The device according to claim 1, wherein cylinders for folding/unfolding the spray bars are inserted between each holder and its associated structure.

4. An agricultural spray vehicle, comprising a device according to claim 1, supporting spray bars mounted on said holders.

5. The device according to claim 1, wherein rotation of the right and left structures causes clockwise rotation of the right spray bar which causes clockwise rotation of the left spray bar, and the action of the primary and secondary elastic elements causes the right and left spray bars to return to a position wherein the right and left spray bars pivot counterclockwise.

6. The device according to claim 1, wherein the first and second clevis mountings extend over substantially one quarter of the circumference of said rotational supports.

7. The device according to claim 1, wherein the third and fourth clevis mountings extend over substantially one quarter of the circumference of the rotational supports in a manner complementary to the first and second clevis mountings.

8. The device according to claim 1, wherein in a braking condition, the primary elastic elements includes a plurality of primary springs and the secondary elastic elements include first and second secondary springs, and the plurality of primary springs and the first secondary spring are compressed by different degrees and the second secondary spring is relaxed.

9. The device according to claim 1, wherein in an accelerating condition, the primary elastic elements includes a plurality of primary springs and the secondary elastic elements include first and second secondary springs, and the plurality of primary springs and the second secondary spring are compressed and the first secondary spring is relaxed.

* * * * *